United States Patent
Carter et al.

(10) Patent No.: US 9,123,006 B2
(45) Date of Patent: Sep. 1, 2015

(54) TECHNIQUES FOR PARALLEL BUSINESS INTELLIGENCE EVALUATION AND MANAGEMENT

(75) Inventors: Stephen R Carter, Spanish Fork, UT (US); Lee Edward Lowry, Orem, UT (US); Vernon Roger Holm, Sandy, UT (US); Atul Mahajan, Lehi, UT (US)

(73) Assignee: Novell, Inc., Provo, UT (US)

( * ) Notice: Subject to any disclaimer, the term of this patent is extended or adjusted under 35 U.S.C. 154(b) by 657 days.

(21) Appl. No.: 12/607,103

(22) Filed: Oct. 28, 2009

(65) Prior Publication Data

US 2011/0040805 A1    Feb. 17, 2011

Related U.S. Application Data

(60) Provisional application No. 61/232,998, filed on Aug. 11, 2009.

(51) Int. Cl.
  G06F 7/00 (2006.01)
  G06F 17/30 (2006.01)
  G06Q 10/06 (2012.01)
(52) U.S. Cl.
  CPC ........ *G06Q 10/063* (2013.01); *G06F 17/30569* (2013.01); *G06F 17/30864* (2013.01); *G06F 17/30867* (2013.01)
(58) Field of Classification Search
  CPC ................. G06F 17/30569; G06F 17/30864
  USPC .......................... 707/803, 807, 808, 809, 811
  See application file for complete search history.

(56) References Cited

U.S. PATENT DOCUMENTS

| | | | |
|---|---|---|---|
| 5,404,503 A | 4/1995 | Hill et al. | |
| 6,199,068 B1 * | 3/2001 | Carpenter | ............................ 1/1 |
| 6,292,792 B1 | 9/2001 | Baffes et al. | |
| 6,999,961 B2 | 2/2006 | Hall | |
| 7,321,310 B2 * | 1/2008 | Curkendall et al. | ........ 340/573.3 |
| 7,886,046 B1 * | 2/2011 | Zeitoun et al. | ................ 709/224 |
| 7,921,046 B2 * | 4/2011 | Parsons et al. | ................... 705/35 |
| 2002/0055914 A1 | 5/2002 | Liu et al. | |
| 2005/0015623 A1 * | 1/2005 | Williams et al. | .............. 713/201 |
| 2005/0131825 A1 | 6/2005 | Vijay | |
| 2005/0222810 A1 * | 10/2005 | Buford et al. | ................. 702/183 |
| 2005/0267871 A1 * | 12/2005 | Marchisio et al. | ................. 707/3 |
| 2007/0027768 A1 * | 2/2007 | Collins et al. | .................... 705/14 |
| 2007/0088704 A1 | 4/2007 | Bourne et al. | |
| 2007/0112714 A1 * | 5/2007 | Fairweather | ..................... 706/46 |
| 2007/0168374 A1 | 7/2007 | Bourne et al. | |
| 2007/0203996 A1 * | 8/2007 | Davitz et al. | ................... 709/206 |
| 2008/0243727 A1 | 10/2008 | Weber | |
| 2009/0133047 A1 * | 5/2009 | Lee et al. | ......................... 725/10 |
| 2009/0150334 A1 * | 6/2009 | Labadie et al. | .................... 707/1 |
| 2009/0150919 A1 * | 6/2009 | Lee et al. | ......................... 725/10 |
| 2009/0157593 A1 * | 6/2009 | Hayashi et al. | .................... 707/1 |
| 2009/0271179 A1 * | 10/2009 | Marchisio et al. | ................. 704/9 |
| 2009/0287837 A1 * | 11/2009 | Felsher | ......................... 709/229 |
| 2010/0036712 A1 * | 2/2010 | Abrahamsohn | ................. 705/10 |
| 2010/0169343 A1 * | 7/2010 | Kenedy et al. | ................. 707/758 |

* cited by examiner

*Primary Examiner* — Mark E Hershley
(74) *Attorney, Agent, or Firm* — Schwegman Lundberg & Woessner, P.A.

(57) ABSTRACT

Techniques for parallel business intelligence and management are provided. Data is collected from a variety of disparate sources and from a variety of disparate network locations. The data is then filtered and normalized. Next, relationships between elements in the data are established and correlations are created between the elements. The elements are then tagged and integrated with other data of a distributed knowledge store to create customized business intelligence reports and customized data visualizations.

19 Claims, 4 Drawing Sheets

TECHNIQUES FOR PARALLEL BUSINESS INTELLIGENCE EVALUATION AND MANAGEMENT

RELATED APPLICATIONS

The present application is co-pending with, a non-provisional of, and claims priority to U.S. Provisional Application Ser. No. 61/232,998; entitled: "Techniques for Parallel Business Intelligence Evaluation and Management," and filed on Aug. 11, 2009; the disclosure of which is incorporated by reference herein and below in its entirety.

BACKGROUND

Increasingly, information is being moved over networks, such as the Internet, to conduct affairs of individuals, governments, and enterprises. Devices are more powerful and mobile, such that network connectivity can be acquired from nearly any spot on the globe on demand by any individual. Even with the availability of information, timely gathering it and utilizing it in a meaningful way is a real challenge.

Enterprises have expended a large amount of human resources, capital investments in equipment, and money to gather business information within the enterprises. This information is indexed, backed up, replicated, searched, and mined on a daily basis.

Typically, an enterprise's information resides in an enterprise's database (data warehouse). This data warehouse is queried using specific search criteria in order to obtain business intelligence. The business intelligence then drives daily operations of the enterprise and interactions between the enterprise and its customers.

This information gathering and mining process often precludes smaller businesses and individuals from benefiting from conventional business intelligence because these smaller enterprises lack the resources to form and manage data warehouses.

Thus, what are needed are improved information management techniques to make information more readily usable in cost-effective and timely manners.

SUMMARY

In various embodiments, techniques for parallel business intelligence and management are presented. More specifically, and in an embodiment, a method for parallel business intelligence and management is provided. Specifically, data is gathered from a plurality of disparate sources and disparate locations over a network. Next, the data is filtered and then normalized to create modified data. Relationships between elements of the modified data are created to establish structured data and components of the structured data are correlated to establish correlated data. Pieces of the correlated data are then tagged to create tagged data and portions of the tagged data are merged with other previously tagged data to provide a distributed knowledge store.

DETAILED DESCRIPTION

Figure 1:
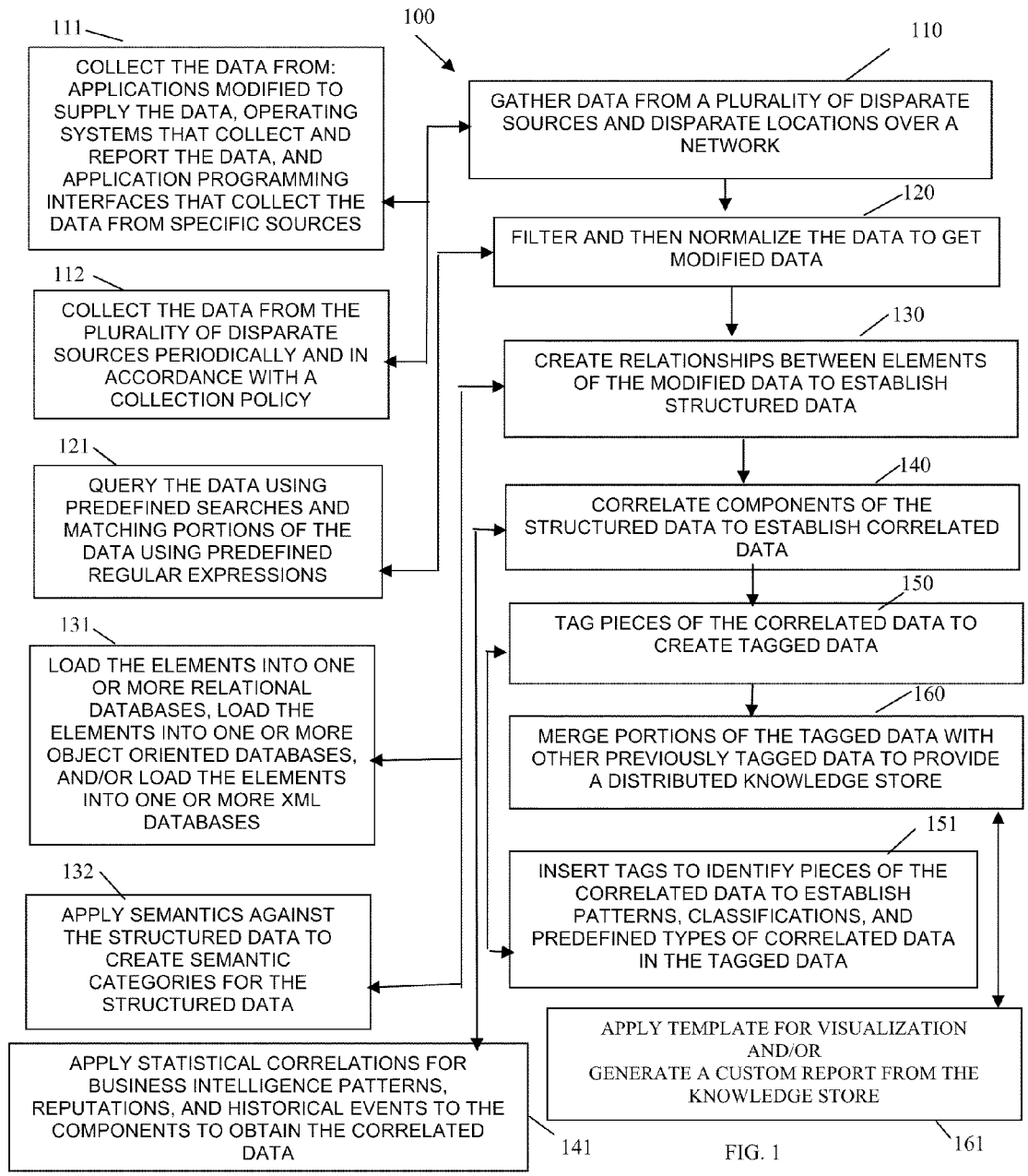
FIG. 1 is a diagram of a method for parallel business intelligence and management, according to an example embodiment.

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "network node" or "node" refers to a physical or virtual (virtual machine) processing device, such as but not limited to, a router, a network bridge, a hub, a network switch, a server, a proxy, a client, etc.

As used herein "data sources" refer to different types of data such as data acquired from emails, Simple Network Management Protocol (SNMP) data, system logs, operating system logs, Instant message histories, text message histories, histories on social networking websites, conventional repositories, such as databases, directories, web portals, data produced by software applications or services, Application Programming Interface (API) generated data, event streams, etc. The data from these data sources is gathered and organized in the manners discussed herein and below to permit improved business intelligence decisions from usage of a distributed knowledge store. Two data sources are disparate from one another if their data formats are not compatible. Moreover data sources reside in different network locations. In an embodiment, the network is the entire Internet with access to selective Intranets utilizing the proper security credentials.

Various embodiments of this invention can be implemented in existing network architectures. For example, in some embodiments, the techniques presented herein are implemented in whole or in part in the Novell® network and proxy server products, operating system products, directory-based products and other products distributed by Novell®, Inc., of Provo, Utah.

Also, the techniques presented herein are implemented in machines, such as processor or processor-enabled devices. These machines are configured to specifically perform the processing of the methods and systems presented herein. Moreover, the methods and systems are implemented and reside within computer-readable storage media and processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

FIG. 1 is a diagram of a method 100 for parallel business intelligence and management, according to an example embodiment. The method 100 (hereinafter "business intelligence service") is implemented in a machine-accessible and computer-readable medium and instructions that execute on one or more processors (machines, computers, processors, etc.). The machine is specifically configured to process the business intelligence service. Furthermore, the business intelligence service is operational over and processes within a network. The network may be wired, wireless, or a combination of wired and wireless.

At 110, the business intelligence service gathers data from a plurality of disparate data sources and disparate locations over a network.

Some example collections of data and locations for that data are provided below in detail with reference to the discussion of the FIG. 4. The data sources and the data are distributed over the network. Again, the network can be a combination of the Internet and a variety of selective Intranets (internal organizational networks) for which access is permitted or for which communication is allowed. Moreover, this data is collected in a variety of manners.

For example, at 111, the business intelligence service collects the data from applications or services that are modified to supply the data. In other cases, operating systems are modified to collect and report certain types of data to the business intelligence service. Still further, Application Programming Interfaces (API's) are provided for interacting with data producers and acquiring data that is then provided to the business intelligence service. These applications and services can be web-based portals, social networking sites, governmental sites, or any other sites producing data that the business intelligence service is designed and configured to collect.

According to an embodiment, at 112, the business intelligence service collects the data from the plurality of disparate sources periodically and in accordance with a collection policy. That is, some of the data providers can be configured to dynamically push data when it is produced to the business intelligence service. Other data providers can be designed to batch data when it is produced and send it to the business intelligence service at certain predefined intervals or upon a certain size of the collected data being reached. Additionally, the business intelligence service may actively crawl or push request for data to data providers at predefined time intervals or upon successful evaluation of a collection policy that indicates the business intelligence service is to actively request data from the providers. So, data can be pushed to the business intelligence service by data providers and data can be also pulled from the data providers by actions of the business intelligence service using an API to interact with the data providers. Data may also be pulled by accessing it remotely over the network or via data collection agents.

At 120, the business intelligence service filters and then normalizes the data to create or obtain modified data. That is, the raw data collected is then mapped into patterns that are of interest to the business intelligence service. These patterns can be defined in a variety of manners.

For example, at 121, the business intelligence service can use a query against the data or other data sources via predefined search criteria to obtain search results, the search results are a filter or subset of the overall collected data. In another case, the business intelligence service matches portions of the collected data to predefined regular expression patterns. These regular expression patterns filter the collected data for specific data patterns that are of interest. The search criteria and the regular expression patterns can be part of a knowledge store that is used to filter the data collected into portions of data that is of interest to an enterprise.

At 130, the business intelligence service creates relationships between elements of the modified data to establish structured data. The data is already collected and filtered. Here, the data is put into a format where relationships can be inferred and readily ascertained from in an automated manner.

For example, at 131, the business intelligence service loads the elements into one or more relational databases, loads the elements into one or more object oriented databases, and/or loads the elements into one or more extensible markup language (XML) databases. The database model provides structure and relationships between the elements of the data and provides an API for obtaining the relationships from the data.

In still another embodiment of 130, at 132, the business intelligence service applies semantics against the structured data to create semantic categories for the structured data. Here, semantic templates that define semantic categories of semantic relationships can be superimposed onto the already structured data to generate even more relationships within the structured data.

At 140, the business intelligence service correlates components of the structured data to establish correlated data. Correlation creates even more data relationships based on such things as statistics.

For example, at 141, statistical analysis of the components can create correlations identifying business intelligence patterns, reputations, and historical events within the correlated data. Businesses often have statistical templates or models that given certain factors the likelihood of something else occurring is greater. For instance, if a customer buys product Y and is female, then there is a high likelihood that product Z can be up-sold to customer. With reputations, some comments by author maybe less valuable then other comments of a different author when the reputations for the two authors are different. With historical events, knowing that a large amount of generators were purchased in Cincinnati on a certain day is of little value unless the day is put into historical context with the data, such as when the day in question was a massive power outage.

At 150, the business intelligence service tags pieces of the correlated data to create tagged data. Here, tags permit automatic association of the data to other like tags and permit tags to be arranged hierarchically or in different formats that may be useful to consumers.

So, at 151, the business intelligence service inserts tags into the correlated data to establish patterns, classifications, semantics, and/or predefined types of correlated data within the tagged data.

At 160, business intelligence service merges portions of the tagged data with other previously tagged data to provide a distributed knowledge store.

According to an embodiment, at 161, the business intelligence service applies templates for custom visualization of the data from the distributed knowledge store. Also, at 161, the business intelligence service can be used to generate custom reports from the distributed knowledge store.

Essentially, once the data is acquired from a variety of network sources and enhanced in the manners discussed with reference to the processing at 110-150, the business intelligence service can merge other data having other tags together to create unique data visualizations and unique custom reports.

One now appreciates how distributed data from a variety of sources can be enhanced and linked together in a distributed knowledge store for use by an individual or enterprise. This is done in an automated manner with minimal resources. In fact, the processing can be distributed over multiple network machines and the distributed knowledge store can be distributed over the network. This permits more timely business intelligence reporting and management and it provides such techniques to the masses over the Internet, which heretofore has not been possible.

Figure 2:
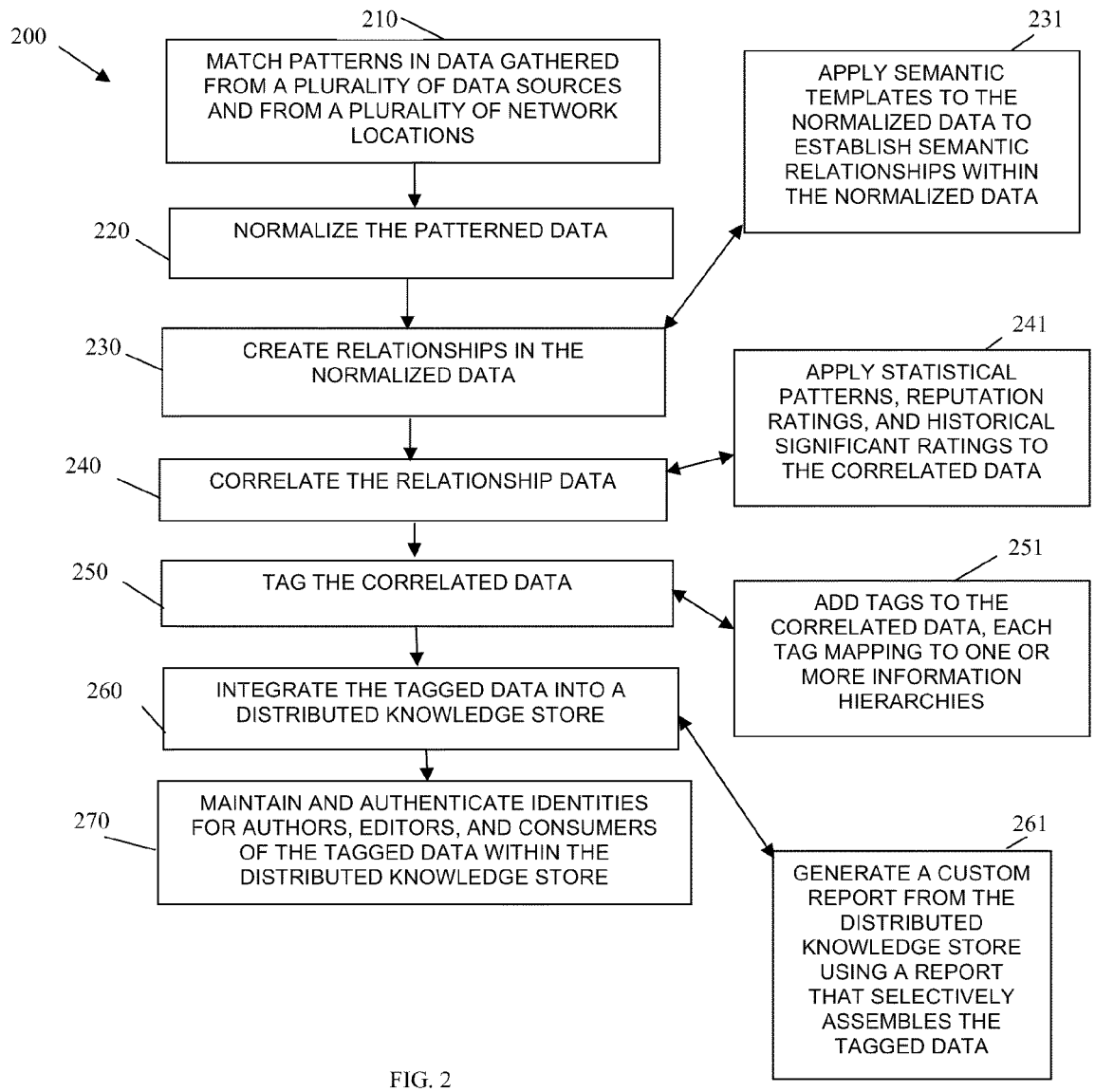
FIG. 2 is a diagram of another method for parallel business intelligence and management, according to an example embodiment.

FIG. 2 is a diagram of another method 200 for parallel business intelligence and management, according to an example embodiment. The method 200 (hereinafter "business management service") is implemented in a machine-accessible and computer-readable storage medium as instructions that execute on one or more processors of a network node. The business management service is operational over a network. The network may be wired, wireless, or a combination of wired and wireless. Furthermore, the processor is specifically configured to process the business management service.

At 210, the business management service matches patterns in data. The data is gathered from a plurality of data sources and from a plurality of network locations. Data providers may be configured to push the data or may be configured to supply the data when requested to do so by data collection agents (via a pull mechanism) or by the business management service (via a pull mechanism). Policy can drive what data providers are used, what types of data are acquired, what mechanisms of data collection are used, and what frequency for which the data are collected.

At 220, the business management service normalizes the patterned data. Here, the data is filtered, mapped to templates, and normalized into an intermediate format for the remaining processes that manipulate and enhance the data. Examples of this were discussed above with reference to the method 100 of the FIG. 1 and are also provided in greater detail below with reference to the FIG. 4.

At 230, the business management service creates relationships in the normalized data. Again, this can be done in a variety of automated manners.

For example, at 231, the business management service applies semantic templates to the normalized data to establish semantic relationships within the normalized data.

At 240, the business management service correlates the relationship data. Again, correlation based on business intelligence statistics, reputation ratings, and historical events were provided above in detail with the reference to the method 100 of the FIG. 1 and are again discussed below with reference to the FIG. 4.

So, in an embodiment, at 241, the business management service applies statistical patterns, reputation ratings, and historical significant ratings to the correlated data.

At 250, the business management service tags the correlated data. The tagging permits an automated mechanism to tie the enhanced data with other enhanced data into a distributed knowledge store.

According to an embodiment, at 251, the business management service adds tags to the correlated data. Each tag maps to one or more information hierarchies. That is, the tags themselves can be hierarchical and can be arranged in information hierarchies. Some can be predefined or some custom defined by business analysts.

At 260, the business management service integrates the tagged data into a distributed knowledge store. Here, other previously tagged data resides and the tagged data is merged therein. It may also be that existing similar tagged data residing within the knowledge store can be merged up or mashed up to create unique and custom business intelligence for an enterprise and this is done in an automated and dynamic fashion.

For instances, at 261, the business management service generates a custom report from the distributed knowledge store using a report that selectively assembles certain tagged data from the knowledge store.

In another embodiment, at 270, the business management service maintains and authenticates identities for authors, editors, and consumers of the tagged data within the distributed knowledge store. So, authentication and identity-based reports and tracking can occur in an automated manner. It is noted that any resource can include an identity and that the business management service can manage and track any resource having an identity. The business management service may even interact with one or more identity services to create and establish identities for resources being processed as data that initially lack any specific identity.

Figure 3:
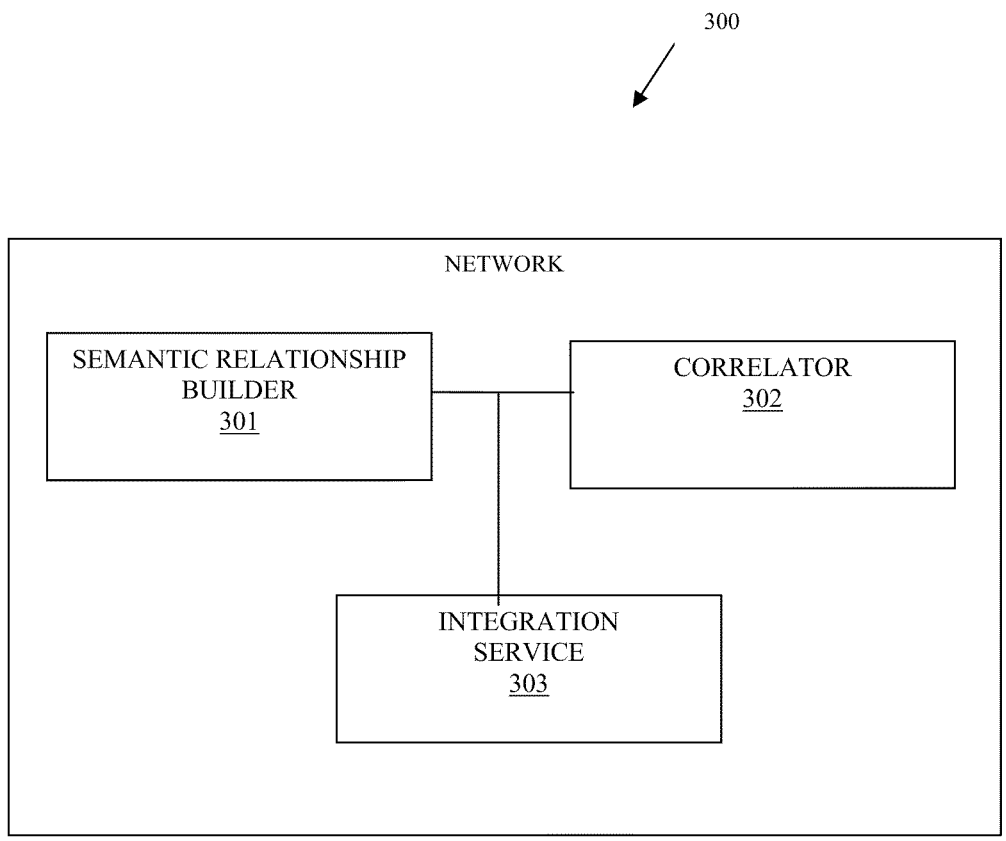
FIG. 3 is a diagram of a business intelligence and management system, according to an example embodiment.

FIG. 3 is a diagram of a business intelligence and management system 300, according to an example embodiment. The business intelligence and management system 300 is implemented in a machine-accessible and computer-readable storage medium as instructions that execute on one or more processors (multiprocessor) and that is operational over a network. The one or more processors are specifically configured to process the components of the business intelligence and management system 300. Moreover, the network may be wired, wireless, or a combination of wired and wireless. In an embodiment, the business intelligence and management system 300 implements, among other things, certain aspects of the methods 100 and 200 represented by the FIGS. 1 and 2, respectively.

The business intelligence and management system 300 includes a semantic relationship builder 301, a correlator 302, and an integration service 303. Each of these will now be discussed in turn.

The semantic relationship builder 301 is implemented within and resides within a computer-readable storage medium and is to process on one or more processors of the network. In fact, it is noted that multiple instances of the semantic relationship builder 301 can be independently processing on different processors of the network in parallel to one another. Example aspects of the semantic relationship builder 301 were presented in detail with reference to the methods 100 and 200 of the FIGS. 1 and 2, respectively.

The semantic relationship builder 301 is configured to dynamically and automatically establish relationships in distributed data, which is collected over the network.

According to an embodiment, the semantic relationship builder 301 is further configured to use semantic templates to establish semantic categories within the relationships.

The correlator 302 is implemented within and resides within a computer-readable storage medium and is to process on one or more processors of the network. Again, multiple instances of the correlator 302 can be independently processing on different processors of the network in parallel to one another. Example aspects of the correlator 302 were presented in detail with reference to the methods 100 and 200 of the FIGS. 1 and 2, respectively.

In an embodiment, the correlator 302 is further configured to create business correlations, reputation correlations, and/or historical correlations between the elements of the data.

The integration service 303 is implemented in and resides within a computer-readable storage medium and is to process on one or more processors of the network. Once more, the integration service 303 can execute as multiple parallel instances of itself on different processors of the network. Example aspects of the integration service 303 were presented above with reference to the methods 100 and 200 of the FIGS. 1 and 2, respectively.

In an embodiment, the integration service 303 is further configured to tag the elements and use tags assigned to the elements to integrate the elements with other elements or other data that already exists in the distributed knowledge store. This permits mashing up selective information into custom visualizations and custom reports and is further discussed below with reference to the FIG. 4.

Figure 4:
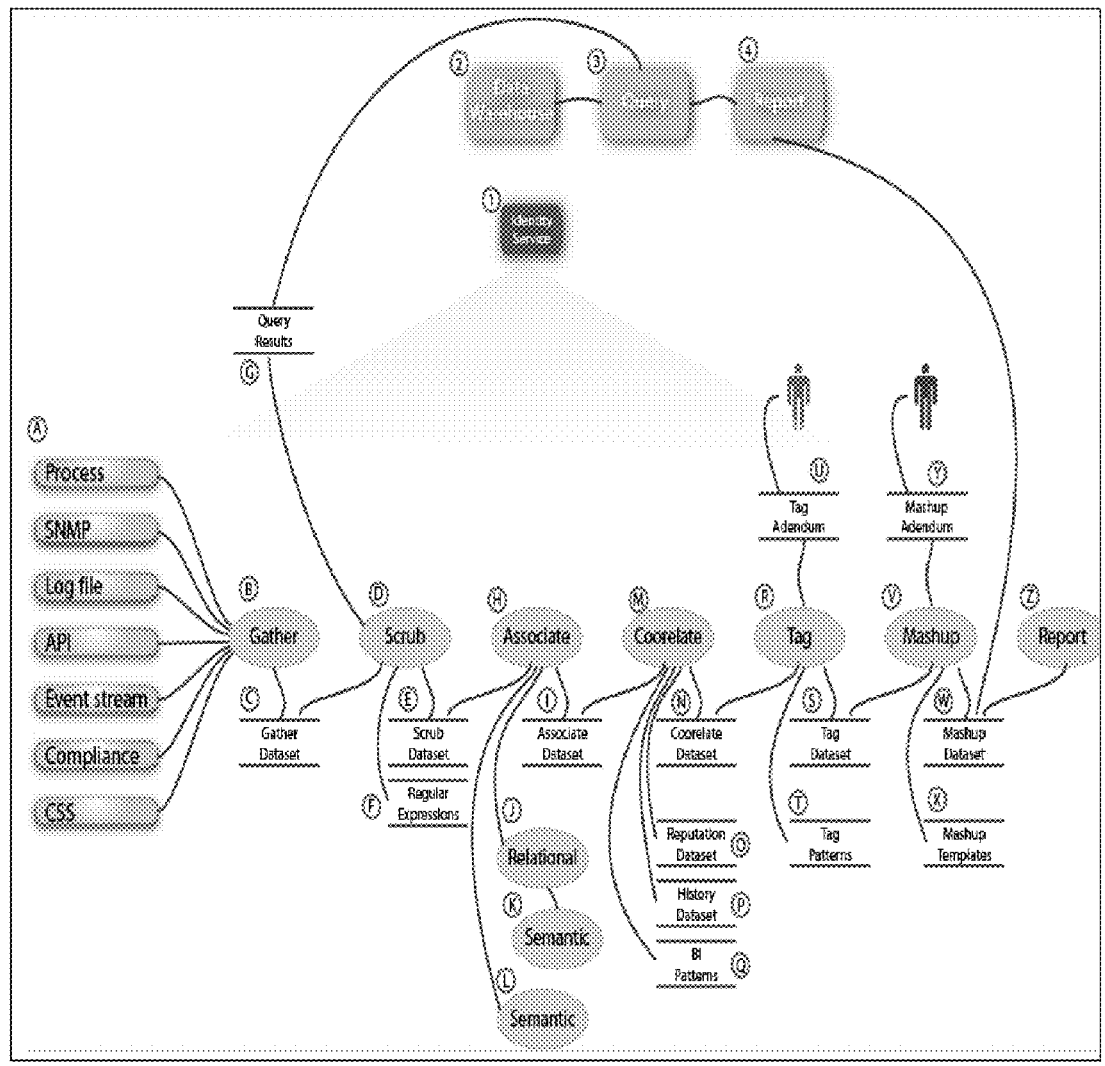
FIG. 4 is a diagram of interactions between components of a business intelligence and management system, according to an example embodiment.

FIG. 4 is a diagram of interactions between components of a business intelligence and management system, according to an example embodiment.

The components of the diagram of FIG. 4 can be utilized in the system 300 discussed above with reference to the FIG. 3.

Interaction of the components and processing scenarios are now provided in detail with reference to the FIG. 4.

Sources of raw and processed data (at A) concerning a business and its operations are obtained at A that data comes from processes, which are instrumented to provide information concerning their functioning and processing, SNMP, log files residing in the file system or other data repository locations, APIs wherein processes or operating systems or hypervisors utilize the API to inject business intelligence data directly into the business intelligence gathering process, event streams wherein products such as Novell's Sentinel® have already produced an event stream specific to certain correlated events, compliance reporting log files, Novell's CSS (Cloud Security Service) wherein information is generated concerning cloud annexation and jurisdictional mapping. Other sources of business intelligence information may also be added to this list.

As is known modified identity services are provided at 1 wherein identity information concerning individuals, groups, roles, etc. can be provided to all of the steps within the invention to either provide identity as a part of the development of data order or dereference identity from a previous process for utilization at a current process.

At B the raw data represented at A is gathered into Gather Dataset at C wherein the Gather process gathers the raw data according to some predetermined partitioning method. Such methods may include a time. (E.g., every hour, every day, every week) or other partitioning methods wherein a trigger can delineate the partition. While C is shown as a singular data repository in the diagram, it is understood that all data repositories depicted in the diagram could have multiple instantiations. So, there may be many C data repositories representing a continuum of business intelligence. It's also well to note that the various C data repositories may overlap (e.g. if the partitioning is one day then perhaps the following data repository contains the same information as the last hour of the previous data set). In an embodiment overlap is not necessary because multiple data repositories at C are available so that multiple partitioned data repositories can be considered at once.

The data repositories at C are made available to the scrub process at D wherein the raw data is evaluated to find that data that is pertinent according to some selection criteria such as that shown at F, which (in an embodiment) involves the use of regular expressions to select pertinent information to enter into the E, scrub data set. In an embodiment query results from a legacy data warehouse system are provided a G, which can then be processed as aforementioned. The result of D is the creation of E, the scrub data set in a normalized and standardized form (e.g., as the data is scrubbed it is also formatted into a taxonomy which is not shown in the diagram) which is made available to the next step H, Associate.

Since the business intelligence information is coming in from a variety of systems processes protocols and mechanisms, the various data items need to be associated so that relationships can be formed. In an embodiment the information provided at E is inserted into one or more relational databases at J, which provides for the automatic creation of relationships because of the declaration of primary keys, secondary keys, and foreign keys in the relational database as they pertain to the taxonomy from the E. In an embodiment a relational database can be used, an XML database can be used, and object-oriented database can be used, etc. In any eventuality, information is organized by the mechanism at J, which can then be further processed such as at K, wherein semantics can be imposed upon the organize data at J. For example, secondary relations can be created as a result of known interactions between primary, secondary, or foreign keys. The semantic mapping occurs because of a priori knowledge, which is instantiated via the K. In an embodiment, semantic organization can also be provided at L, where in semantic processing can be done on the data provided at E such as mechanisms available as semantic characterization of content. In any eventuality, the final result is an associate data set at I wherein the associated data is made available in the form, and wherein the associations are plainly encoded. In an embodiment this is done by exporting the relational database at J into an XML form. In an embodiment the associated data created that J, as modified by K, is exported into an XML document, wherein the relationships are preserved (such as the use of ID and IDREF). In an embodiment other export forms such as comma delimited I also be used. In an embodiment I is the relational database created at J (understanding that if J. is not relational database, any kind of other type of database could be utilized as well).

The associate data set at I is provided to the correlate process at M, such that the associated data is now correlated. Correlation can take into account statistical processing using the business intelligence patterns such as Q, which is stored as custom or temporal correlation patterns such as at P. (for example, P. may contain information concerning the beginning and closing of financial blackout periods which generally preceded the announcement of earnings and historical events might also be included wherein the enterprise has historical confirmation that certain business processes are affected by certain outcomes such as national holidays in different ethnic or geographic areas in a worldwide enterprise). Likewise, reputation at O may be utilized to correlate based on reputation concerning a geographic location, individual identity, group identity, etc. The end result of M is the development of M, the correlate data set wherein the business intelligence data is now correlated statistically, historically, and by reputation. Of course, other forms of correlation may also be provided which meet the intent of the invention.

The information at N is provided to the tagging process at R such that the information is tagged according to tagging patterns at T or tagging addendum of patterns at U, for example, if the result of N is an XML document, the step R will look for words, word combinations, phrases, element names, attribute names, etc. and add XML elements or attributes to tagged the appropriate content in the document with the tagging information. Likewise, the tag addendum at U is new tagging instructions and by an administrator or some other kind of agent that is looking for new patterns so that new tags can be developed. In an embodiment the tag addendum contains tagging information that is investigative in nature so that new tags can be developed and proven before added to tagging patterns at T. In this case the tags that are being experimented with at U are tagged as experimental so that they do not enter production until they have been proven. The result of this step is S, the tagged data set where the content that has been gathered to date and from step N is now tagged according to the tagging patterns which presumably are associated with the policies and operational methods that the enterprise chooses to control their processes and data center.

The mashup step at V now utilizes the tag data set at S along with mashup template at X and mashup addendum at Y to produce the mashup data set at W. Mashup is a term used to indicate that data from disparate sources are pulled together and correlated in such a way that new reports or visualizations can be presented. In this case, there is a lot of disparate information that has been associated, correlated, and tagged that has a very rich content base where a mashup can be used very profitably. The mashup data set then at W provides mashed up content for each mashup template. In an embodiment the mashup addendum at Y is used to develop new mashup and is developed by an administrator or some other type of agent. In an embodiment the mashup addendum represents mashup that is still under discussion and should not be used for production. In this case the mashup circularly mark as experimental. In an embodiment any tagging information that is marked experimental will cause a mashup that is produced from experimental data to be marked experimental or at least of the content highlighted in some form to show that experimental content is being used in the mashup. This is critical to prevent incorrect decisions from being made when based upon experimental information.

Finally, the report step at Z utilizes the mashup data set at W to produce the reports, charts, and other types of visualization.

In an embodiment the mashup data set at W can be formatted in such a way that a report module from a traditional business intelligence package can utilize the information as is shown at 4. In an embodiment query results at G can be processed through the invention and then the report at 4 produced and compared with the report that would normally be produced by the legacy business intelligence system.

In an embodiment 1 is an identity service and which provides identity at all steps so that business intelligence information and the final resulting reports can be enhanced with authoritative identity information.

In an embodiment, the invention is implemented as cloud processes and queuing mechanisms so that any given step of B, D, H, M, R, V, or Z could be in the cloud. As well the list above could also be replicated if needed to provide additional processing when needed (for example the correlate step may be more resource intensive than the other steps and therefore more than one M may be needed in order to process the business intelligence information in a timely manner).

In an embodiment, invention produces business intelligence information itself at each step which can then be aggregated by the invention to provide business intelligence reports on the invention's implementation.

Existing technology is generally monolithic in nature and relies upon database technology (such as Oracle and DB2) to perform the processes of association correlation. As well, existing technology generally creates very large data warehouses wherein tens of terabytes are stored and queried. Generally, processes are used to lock out the current time where business intelligence information is being added to the data warehouse. Likewise, existing technology does not have the richness of tagging and mashup nor is the problem space broken down into elements where cloud computing and storage can be used advantageously.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing within a computer-readable storage medium that is executed by one or more processors of a network to perform the method, comprising:
   gathering data from a plurality of disparate sources and disparate locations over a network at predefined time intervals, the network is a combination of the Internet and selective Intranets, and the data gathered from emails, Simple Network Management Protocol (SNMP) histories, operating system logs, Instant Message histories, system logs, directories, web portals, data produced by applications/services, text message histories, histories on social networking websites, Application Programming Interface (API) generated data, and event streams;
   filtering and then normalizing the data to get modified data;
   creating relationships between elements of the modified data to establish structured data;
   correlating components of the structured data to establish correlated data based at least in part on a reputation concerning a geographic location associated with the data, an individual identity associated with the data, and a group identity associated with the data and correlating components of the structured data to establish the correlated data based at least in part on temporal correlation patterns;
   tagging pieces of the correlated data to create tagged data based on tagging patterns;
   inserting a tag addendum into the correlated data as a tagging instruction for subsequent investigation as a potential new tag for inclusion in the tagging patterns, wherein the tag addendum does not alter evaluation of the correlated data;
   merging portions of the tagged data with other previously tagged data to provide a distributed knowledge store; and
   distributing the method processing over multiple network machines and distributing the distributed knowledge store over the network.

2. The method of claim 1, wherein gathering further includes collecting the data from: the applications/services modified to supply the data, operating systems that collect and report the data, and application programming interfaces that collect the data from specific sources.

3. The method of claim 1, wherein gathering further includes collecting the data from the plurality of disparate sources periodically and in accordance with a collection policy.

4. The method of claim 1, wherein filtering further includes querying the data using predefined searches and matching portions of the data using predefined regular expressions.

5. The method of claim 1, wherein creating further includes: loading the elements into one or more relational databases, loading the elements into one or more object oriented databases, and/or loading the elements into one or more extensible markup language (XML) databases.

6. The method of claim 1, wherein creating further includes applying semantics against the structured data to create semantic categories for the structured data.

7. The method of claim 1, wherein correlating further includes applying statistical correlations for business intelligence patterns, reputations, and historical events to the components to obtain the correlated data.

8. The method of claim 1, wherein tagging further includes inserting tags to identify pieces of the correlated data to establish patterns, classifications, and predefined types of correlated data in the tagged data.

9. The method of claim 1, wherein merging further includes applying one or more templates to merge the portions of the tagged data and the other tagged data into a visualization of the distributed knowledge store.

10. The method of claim 1, wherein merging further includes generating a custom report from the merged portions of the tagged data and the other tagged data.

11. A method implemented and residing within a computer-readable storage medium that is executed by one or more processors of a network to perform the method, comprising:
    matching patterns in data gathered from a plurality of data sources and from a plurality of network locations at predefined time intervals, the network locations include the Internet and selective Intranets;
    normalizing the patterned data;
    creating relationships in the normalized data;
    correlating the relationship data based at least in part on a reputation concerning a geographic location associated with the data, an individual identity associated with the data, and a group identity associated with the data;
    tagging the correlated data based on tagging patterns;
    inserting a tag addendum into the correlated data as a tagging instruction for subsequent investigation as a potential new tag for inclusion in the tagging patterns, wherein the tag addendum does not alter evaluation of the correlated data;
    integrating the tagged data into a distributed knowledge store; and
    distributing the method processing over multiple network locations and distributing the distributed knowledge store over the network locations.

12. The method of claim 11 further comprising maintaining and authenticating identities for authors, editors, and consumers of the tagged data within the distributed knowledge store.

13. The method of claim 11, wherein creating further includes applying semantic templates to the normalized data to establish semantic relationships within the normalized data.

14. The method of claim 11, wherein correlating further includes applying statistical patterns, reputation ratings, and historical significant ratings to the correlated data.

15. The method of claim 11, wherein tagging further includes adding tags to the correlated data, each tag mapping to one or more information hierarchies.

16. The method of claim 11, wherein integrating further includes generating a custom report from the distributed knowledge store using a report that selectively assembles the tagged data.

17. A multiprocessor-implemented system, comprising:
    a semantic relationship builder implemented and residing in a non-transitory computer-readable storage medium, the semantic relationship builder executes on one or more processors of a network;
    a correlator residing in a non-transitory computer-readable medium, the correlator executes on the one or more processors of the network; and
    an integration service residing in a non-transitory computer-readable medium, the integration service executes on the one or more processors of the network;
    the semantic relationship builder is configured to establish relationships in distributed data collected over the network at predefined time intervals, and wherein the correlator is configured to establish correlations between elements of the data based at least in part on a reputation concerning a geographic location associated with the distributed data, an individual identity associated with the distributed data, and a group identity associated with the distributed data, and the integration service is configured to integrate the elements of the data into a distributed knowledge store, the data collected over the network where the network is a combination of the Internet and selective Intranets and the processing of the semantic relationship builder, the correlator, and the integration service are distributed over multiple network machines and the distributed knowledge store distributed over the network, and wherein the integration service is further configured to: i) tag the elements based on tagging patterns, ii) insert a tag addendum into the data as a tagging instruction for subsequent investigation as a potential new tag for inclusion in the tagging patterns, wherein the tag addendum is does not alter evaluation of the data, and iii) use tags assigned to the elements to integrate the elements within other elements of other data that already exists in the distributed knowledge store.

18. The system of claim 17, wherein the semantic relationship builder is configured to use semantic templates to establish semantic categories within the relationships.

19. The system of claim 17, wherein the correlator is configured to create business correlations, reputations correlations, and historical correlations between the elements of the data.

* * * * *